Aug. 10, 1926.
A. T. RAUTENBERG ET AL
AUTO COASTER
Filed July 21, 1925  2 Sheets-Sheet 2
1,595,732
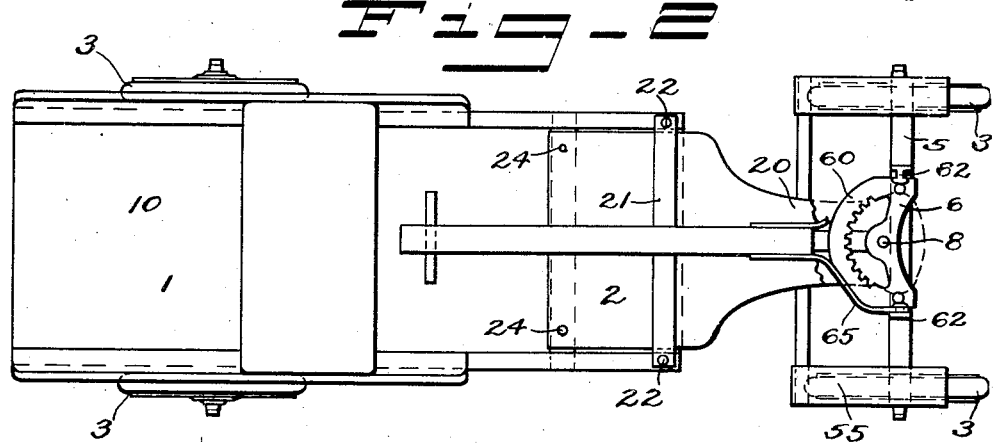
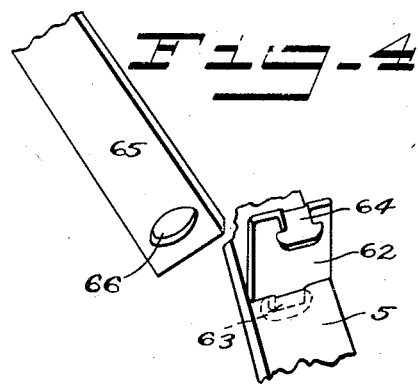
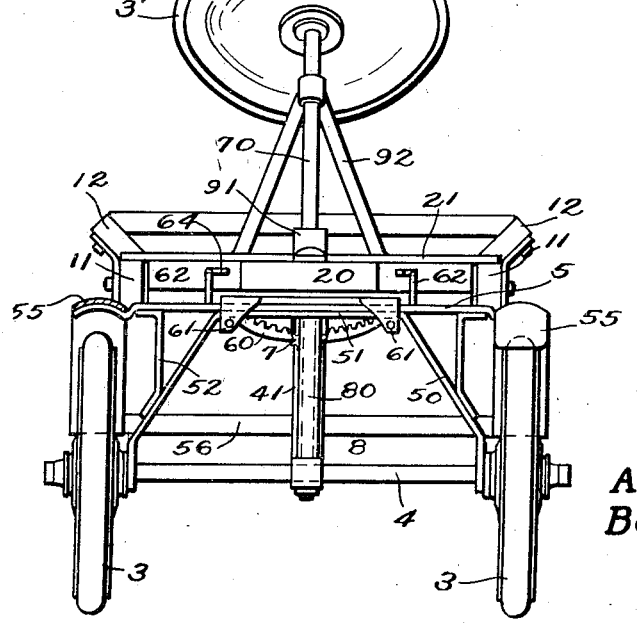
INVENTORS
Alfred T. Rautenberg
Benjamin R. Jones
BY
ATTORNEYS Patented Aug. 10, 1926.

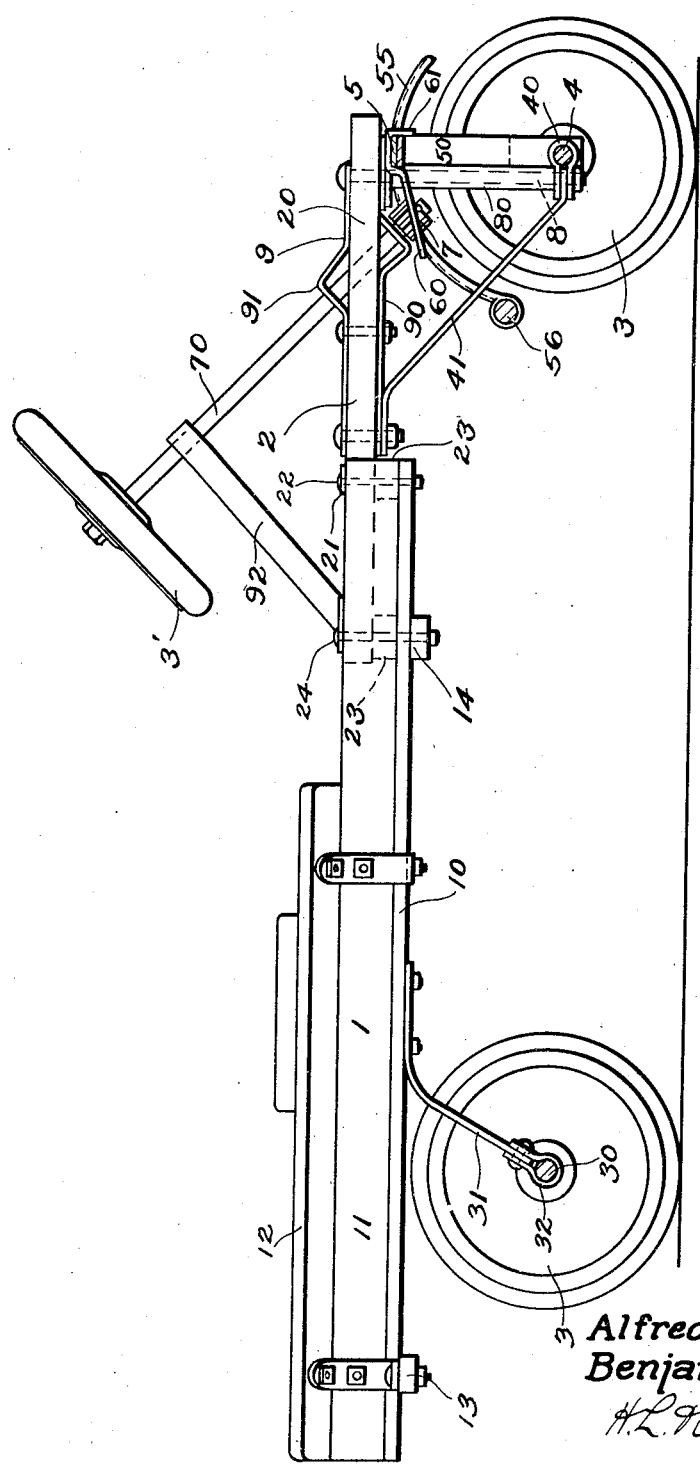

1,595,732

UNITED STATES PATENT OFFICE.

ALFRED T. RAUTENBERG AND BENJAMIN R. JONES, OF SEATTLE, WASHINGTON, ASSIGNORS TO KEEN CORPORATION, OF SEATTLE, WASHINGTON, A CORPORATION OF WASHINGTON.

AUTO COASTER.

Application filed July 21, 1925. Serial No. 44,983.

Our invention relates to wagons of small size, such as are made for the use of children, and which are frequently referred to as coaster wagons.

The object of our invention is to provide a construction for such wagons which shall be rugged and strong, while at the same time being of relatively cheap type of manufacture and one which shall be an improvement in many ways, among which is the provision of means by which the wagon may be steered by means of a wheel, and by which optionally a tongue may be applied thereto, either with or without the use of the steering wheel.

Our invention comprises a number of features of improved construction which will be set forth in the specification and specifically defined in the claims.

The accompanying drawings show our invention in the form in which we now prefer to make it.

Figure 1 is a side view of the wagon, with however, one of the front wheels removed and portions of the construction in section.

Figure 2 is a top or plan view of the wagon with a portion of the forward neck of the body broken away to better show the steering mechanism.

Figure 3 is a front elevation of the wagon with one of the fenders and brake plate in section.

Figure 4 illustrates in perspective the method adopted for securing the tongue to the wagon in such manner that it may be readily disconnected.

The body of this wagon is composed of two principal parts or sections. The major section 1 has bottom boards 10, side boards or bars 11 which are also supplemented in the device as shown, by outwardly flaring side boards 12. Cross bars as 13 and 14 are employed, which extend beneath the floor board or boards 10. The forward or minor section of the body consists of a board 2 which overlaps somewhat the forward end of the major section 1. That portion of the board 2 which extends forwardly of the major section 1 is cut down laterally so as to form a neck 20, of much less width than the body of the wagon. The two sections of the body are secured together by bolting the rear edge of the forward section 2, as by bolts 24, and also by the use of a metal bar 21 which extends over the forward section just over the extreme forward edge of the major section, the two being also secured together by bolts as 22. Between the overlapping portions of the two sections I have shown transverse bars 23. These give transverse strength and slightly separate the two sections.

Upon the rear end of the wagon is an axle 30, and two wheels 3 mounted thereon. This axle is connected with the body of the car by means of two spring bars 31, one end of each of which is bolted securely to the bottom of the wagon body, and the other end of which is secured between the adjacent ends of the clip 32 which surrounds the axle.

Under the front end of the wagon body are two other wheels 3 of the same character. These are mounted upon an axle 4, which axle is secured to the forward end of the neck 20 through the intervention of a compound bolster, the latter comprising a top horizontal bar 5 and a bar 50 which has a central portion 51 secured to the under side of the bolster bar 5, and its ends bent downwardly at an angle and perforated to receive the axle 4. Supplemental brace rods 52 are also employed, these connecting the outer ends of the top bolster plate 5 with the downwardly bent brace portions of the bar 50.

Secured in central position upon the top surface of the bolster plate 5 is a plate 6, which is provided with a hole for the reception of a king pin and also has a circular segmental section 60 which is toothed upon its inner edge and which is adapted to be engaged by a pinion 7 carried by the steering post 70, thereby to steer the wagon. The hole for the reception of the king pin 8 is located so as to just clear the bolster plate 5 at it rear edge.

Secured to the axle 4 is a clip 40 which receives between its ears the lower end of a brace rod 41, the upper end of which is bolted or otherwise secured to the under surface of the forward body section 2. The king pin 8 passes through holes in the ears of clip 40, and also through the hole provided therefor in plate 6. Between the plate 6 and the clip 40 we preferably provide a spacing tube or pipe 80 surrounding the king pin.

On the upper and the lower surfaces of the neck 20 of the forward body section, are secured two bars 9 and 90, these being essentially alike in construction. They each have a section which has a right angle bend and which connects with the other parts of the bar by an angle which, as illustrated, is 135°. These are placed in inverted position, one on the upper surface and one on the lower surface of the neck 20. One side of the bent section 91 in each is bored to receive the steering post 70, and being separated a reasonable distance, forms a stable bearing therefor. A brace bar 92, which is mounted upon the body, supports the upper portion of the steering bar 70. Upon the lower end of this bar the pinion 7 meshes with the teeth in the circular rack section 60 so that by turning the steering bar 70 the front axle and the bolster carried thereby will be turned.

The steering wheel 3′, it is designed shall be a duplicate of the wheels upon which the wagon is mounted. While this similarity in the wheels is not an essential point, it is desirable as it simplifies the manufacture and in case of necessity this wheel may be removed and placed under the wagon.

We have provided the forward edge of the plate 6 with two small ears 61 extending downward and provided each with a hole so that a license plate may be attached thereto if desired.

We have provided means whereby a tongue may be secured to the wagon when desired. Such means as illustrated consist of a short section 62 cut from a plate of iron and having on one end a tongue 63 adapted to pass through an opening punched in the top bolster plate 5 and riveted thereto. At its upper end this section has a lug 64 provided with an enlarged head, the same being bent horizontally. The tongue is designed to be provided with a yoke consisting of the two outwardly bent arms 65, provided at their ends each with a slot 66 of such shape that it will pass over the enlarged head of the lug 64 when the tongue is placed in vertical position. It cannot be removed therefrom unless the tongue is placed in this position. The spacing of the two sections 62 and the width of the yoke formed by the two bars 65 is such that these two bars must be sprung in order to put them on or remove them from the lugs 64. The natural spring given to these bars is in the direction which will tend to hold them in place instead of causing their removal from the lugs 64.

Carried by the outer ends of the bolster plate 5 are two resilient plates 55 which are bent so as to resemble fenders extending over the front wheels rearwardly of the axle. They might, if desired, be carried a considerable distance forwardly also. We have herein shown them as extending a short distance forwardly of the bolster. To the rear ends of these plates 55 is secured a bar 56 which extends across the wagon beneath the body. This bar and to a certain extent also the rear portion of the fenders 55, are designed to serve as a support for the feet of the party riding the coaster. By pressing downward, mainly upon the lower end of the plates 55 or upon the rod 56, the natural spring of the plate will bring it into contact with the peripheries of the front wheels, thereby serving as a brake. If the pressure of the foot is applied mainly to the upper portion of the fender plate, it will not be sprung in such manner as to contact with the wheel and no braking effect will thereby result.

What we claim as our invention is:

1. In a coaster wagon, a body comprising a floor and upwardly extending side bars, cross bars extending transversely over the floor respectively at its forward extremity and a short distance rearward therefrom, a third cross bar beneath the floor and the second cross-bar, a board forming a forward extension having a rear-end fitting between the side bars and bearing upon the two first mentioned cross bars, said parts having vertical dimensions which cause the upper surface of said extension and of the side bars to coincide, said extension forwardly of the main body being of reduced width and at its forward end carrying a king pin bearing for the front axle, and a retaining bar extending over said extension member and the side bars at the forward extremity of the main body, and bolts securing said retaining bar and the body parts together.

2. A coaster wagon comprising a body, a front axle, a bolster, a brace member connecting the bolster and axle, a brace extending from the body to the axle, a king pin extending from the body downwardly along the rear face of the bolster and axle and through the end of said brace, and pivot ears carried by the bolster and axle and embracing the king pin.

3. In a coaster wagon, in combination, a body, a front axle, a bolster carried by the front axle, a plate carried by the bolster and having a king-pin-receiving hole therein located rearwardly of the bolster rear face, a clip surrounding the axle and perforated to receive a king pin rearwardly of the axle, a brace extending forwardly and downwardly and having its forward end perforated and matching with the clip upon the axle, and a king pin connecting the body, said plate, clip and brace.

4. A coaster wagon having a front axle and a bolster pivoted to the body to turn together, a spring plate carried by each end of the bolster and curving over a front wheel rearwardly of the bolster and adapted to serve as a brake, and a bar connecting the lower ends of the said plates extending beneath the body and adapted to serve as a foot rest.

5. A coaster wagon having a bolster and a front axle secured together, spring brake plates carried by the bolster and extending rearwardly over the front wheels, and a bar connecting the rear lower ends of said plates at each side of the wagon and extending beneath the body.

6. A four wheeled coaster wagon having a body reduced in width at its front end to form a forwardly extending neck, a front axle and bolster secured together and resilient fenders secured to the bolster and adapted to be engaged by the feet to function as brakes.

Signed at Seattle, King County, Washington, this 16th day of July, 1925.

ALFRED T. RAUTENBERG.
BENJAMIN R. JONES.